PHASE MODULATED TRANSMITTER WITH FEEDBACK

Filed July 26, 1947 2 Sheets-Sheet 1

INVENTOR.
John Harry Pratt
BY Harry Tunick
ATTORNEY

March 21, 1950 J. H. PRATT 2,501,355

PHASE MODULATED TRANSMITTER WITH FEEDBACK

Filed July 26, 1947 2 Sheets-Sheet 2

INVENTOR.
John Harry Pratt
BY Harry Tunick
ATTORNEY

Patented Mar. 21, 1950 2,501,355

UNITED STATES PATENT OFFICE 2,501,355

PHASE MODULATED TRANSMITTER WITH FEEDBACK

John H. Pratt, Montreal, Quebec, Canada, assignor to Radio Corporation of America, a corporation of Delaware Application July 26, 1947, Serial No. 763,840

3 Claims. (Cl. 332—18)

Figure 1:
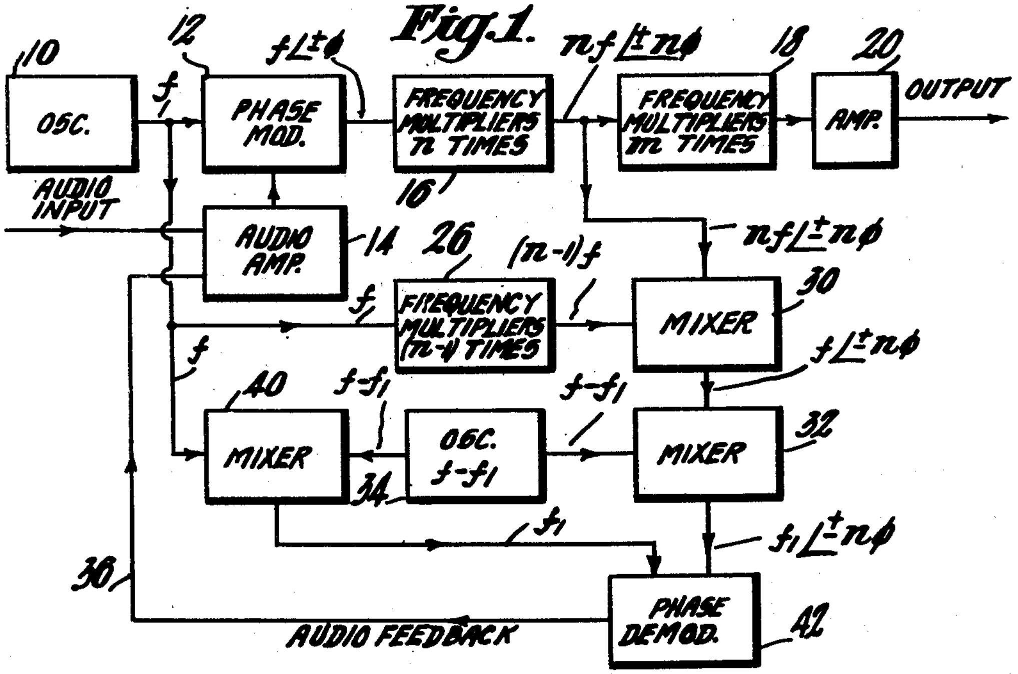

In all phase modulation systems, it is desirable to reduce the phase distortion as much as possible. In multi-channel phase modulation systems where the adjacent channels are close together in the frequency spectrum, reduction of distortion is of first importance since the distortion often takes the form of or results from overmodulation and this causes interference in adjacent channels.

A purpose of the present invention is to reduce the distortion of a phase modulated wave to a very low value such as would be satisfactory for use in multi-channel systems.

This is accomplished in accordance with my invention by providing a novel arrangement wherein negative feedback is used. Output of a phase modulator is multiplied in frequency an amount sufficient to raise the carrier to the desired frequency and to increase the phase deviation the desired amount, and the multiplied energy is used. To reduce the distortion therein, modulated multiplied energy is selected from a point in the frequency multiplier whereat the multiplication is such that the phase deviation is less than 180°. This energy then is mixed with carrier energy that has been multiplied by the same factor minus 1 and the difference frequency is selected from the mixer. The difference frequency is correspondingly phase modulated and is mixed with oscillatory energy of a lower frequency derived from a second oscillator and the difference frequency selected and applied to a phase modulated wave demodulator along with unmodulated oscillatory energy of like carrier frequency derived by mixing energy from the two oscillators. The phase demodulator output is applied to the audio modulation of the phase modulator degeneratively.

In a modification, the first carrier and the difference frequency are applied from the first mixer to the phase demodulator.

To obtain good distortion reduction, the phase detector must be linear over a wide range of operating characteristics which do not change or deteriorate over long periods of time.

Another purpose of my invention is to provide a phase modulated wave demodulator which is linear and stable over a wide phase range.

To attain this last purpose I use a locking circuit of the type disclosed in Finch U. S. Patent #1,844,950 dated February 16, 1932. The phase shifted carrier and unmodulated carrier are fed to the locking circuit tubes to trip the same back and forth between its two positions of stability. The carrier and modulated carrier are phase displaced about 90° in the condition of zero phase modulation, as applied to the locking circuit. Then the time periods during which each tube is in one of its positions (conductive or non-conductive) changes as the phase relation changes to modify the weight of the output of the locking circuit tubes in accordance with the phase changes.

Accurate control of the locking circuit by the wave energies used in the demodulation process is necessary and a further object of my invention is improved means for controlling the locking circuit.

Since this phase demodulator depends for its operation on the production of steep side square waves and sharp pulses, the use of relatively low frequencies therewith is necessary. This necessitated the several mixing processes described above by means of which the frequency reduction is attained. Where lower frequencies are involved in the phase modulator per se, the modification using the single mixer described hereinbefore is satisfactory.

In describing my invention in detail, reference will be made to the attached drawing wherein Fig. 1 illustrates by a block diagram a phase modulation system with distortion correction means arranged in accordance with my invention.

Figure 3:
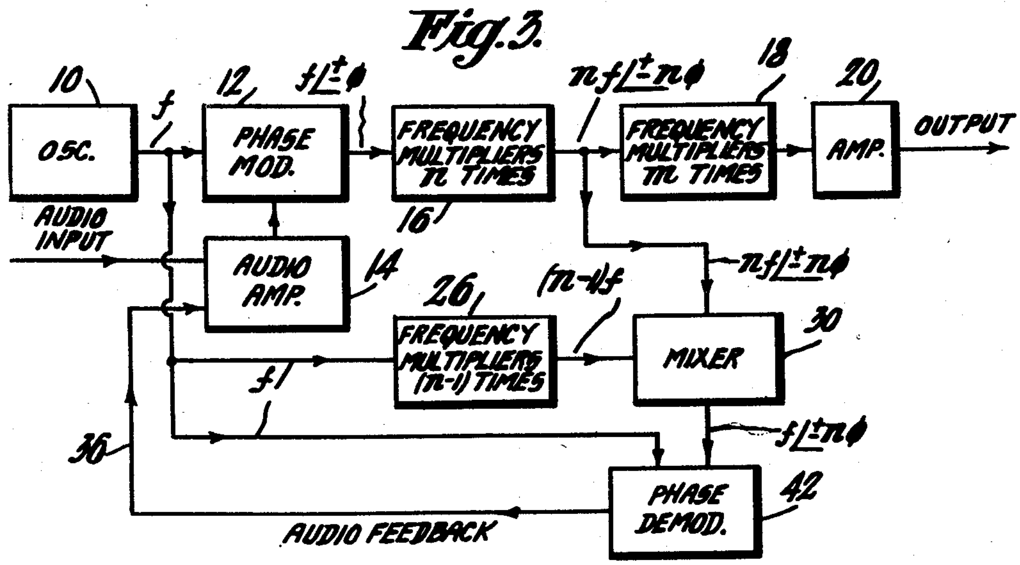
Figure 2:
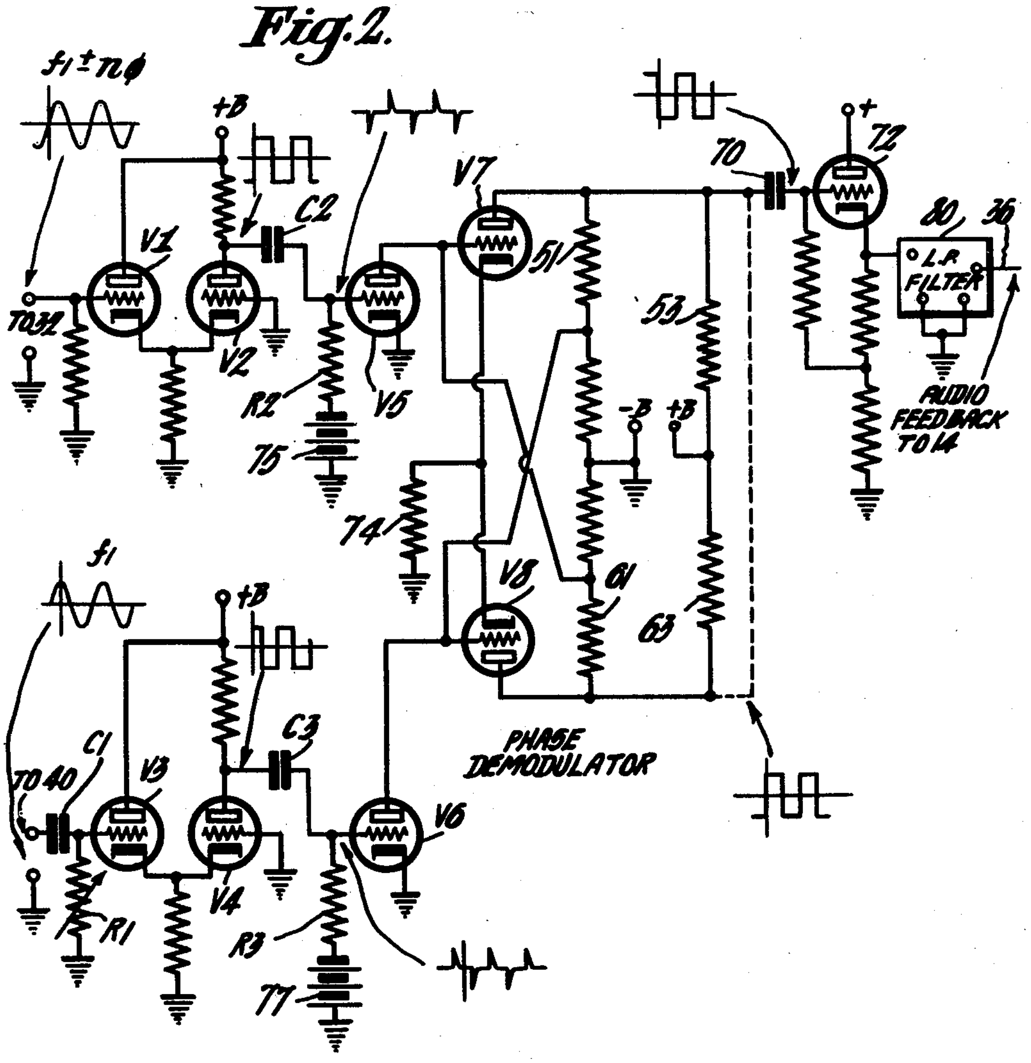

Fig. 2 illustrates by circuit element and circuit element connections the essential features of a phase modulated wave demodulator for use in the system of Fig. 1, while Fig. 3 illustrates by block diagram a modification of the arrangement of Fig. 1.

In the drawings, 10 represents a stable oscillator which may be crystal controlled or an equivalent oscillator. 12 represents a phase modulator stage wherein the oscillations from 10 of frequency $f$ are phase modulated by the output of an audio amplifier 14, the input of which is supplied by audio input as indicated. The phase modulated output of 12 which is represented by a carrier $f$, the phase of which is modulated $\pm\phi$ is supplied to frequency multiplier stages in 16 having a multiplication factor as desired and represented here by $n$. The symbol $$\underline{/\pm\phi}$$

in Fig. 1 is intended to represent the limit of the angular modulation. The multipliers in 16 multiply the carrier frequency frequency and also the phase deviation and the multiplied energy is supplied to other frequency multipliers 18 having a multiplication factor of $m$ and the modulated energy of multiplied frequency and phase deviation is amplified in a unit 20 which supplies output for use as desired.

The elements described above including the phase modulator may be any one of several types suitable for operation at high carrier frequencies. A brief example of a phase modulator which may be used here is illustrated in Roberts U. S. Patent #2,143,386 dated January 10, 1939. The apparatus of the other units is too well known to need description here.

The multipliers in 16 are assumed to have a factor sufficient to increase the phase deviation accomplished in 12 to an amount less than 180°. In a separate multiplier chain comprising unit 26 carrier energy of frequency $f$ as supplied from oscillator 10 is multiplied by a factor one less than the multiple $n$ used to raise the frequency in said first chain of multipliers in 16 sufficiently to obtain a phase modulation which is less than 180°. The output of this separate chain is combined in a mixer stage tube in unit 30 with output from the multiplier 16. At the output of mixer 30 the difference frequency $$f\underline{/\pm n\phi}$$

is selected by filter circuits and supplied to a second mixer 32. (This carrier has a peak swing less than 180°.) An additional oscillator 34 of a frequency $f-f_1$, where $f_1$ is the frequency it is desired to supply to the phase demodulator, supplies output to the mixer 32 and again the difference frequency is selected by filter circuits at the output of 32. This difference frequency is $$f_1\underline{/\pm n\phi}$$

and is filtered out and fed to the phase demodulator 42. Again, the peak modulation swing is less than 180°. The oscillator 34 of frequency $f-f_1$ also supplies energy to a mixer 40 also excited by the original carrier $f$ to supply a difference output of a frequency $f_1$ which is unmodulated and which is also applied to the phase demodulator.

The phase demodulator 42 then is excited by two relatively low frequency inputs, one of which is the carrier $f1$, the phase of which is modulated with a peak swing less than 180° and the other unmodulated energy of a frequency $f1$. The phase demodulator is linear over a wide range as described hereinafter and feeds energy fully representative of the modulation envelope by lead 36 to the audio amplifier 14. The feedback is in such phase as to oppose the input audio voltage, in a sense causing degeneration of the phase modulation which results in decreased distortion and noise. The distortion corrected may be caused by amplitude non-linearity in the audio system, non-linear relationship between voltage and phase in the phase modulator or phase non-linearity in any of the tuned circuits in the multiplier stages up to the point where the feedback input circuit is connected.

The phase demodulator is shown in Fig. 2 and comprises a pair of locking circuit tubes V7 and V8, with their anodes and control grids cross coupled by resistors 51 and 61 in a well known manner such that when current is caused to flow in one tube, say V7, the potential drop at its anode acts through resistor 51 to lower or make less positive the potential on the control grid of V8 and switch all of the current through V7 and cut off tube V8. When the potential on the grid of tube V8 is made more positive or that on the grid of tube V7 made more negative, the reverse action takes place to switch all of the current through V8 so that the locking circuit has, as is well known, two conditions of stability. The anodes of the tubes are connected by resistors 53 and 63 to a direct current potential source which supplies the potentials for operation as described above. The output of one of the tubes say tube V7 is fed through condenser 70 to the control grid of a coupling stage 72 and this output is of the wave form indicated. Although this wave form is indicated as having equal-time positive and negative portions, it is to be understood that this has been done only for purposes of simplification; actually, under the zero-modulation conditions illustrated, the negative portions of such output would have a time duration substantially different from the positive portions thereof.

The operation of the locking stage tubes V7 and V8 is controlled as stated above by modulated carrier and unmodulated carrier. The input electrodes of tube V1 are connected to the mixer 32 while the input electrodes of tube V3 are coupled to the mixer 40. The tubes V1, V2, V3, V4 are current amplitude limiters which transform the sinusoidal waves applied to their input grid electrodes to square output waves. The phase of the unmodulated carrier $f1$ impressed on the input of tube V3 is adjusted by means of the capacitor C1 and variable resistor R1 so as to be substantially 90° out of phase with the center phase (zero modulation) of the modulated carrier $f1 \pm n\phi$ applied to the input electrodes of tube V1. The R. C. circuits C2, R2 and C3 and R3 are short time constant circuits which differentiate the square wave outputs of the limiting amplifier tubes and apply the resulting short pulses to the grids of the trigger or control tubes V5 and V6. The limited outputs of tubes V2 and V4 are shown adjacent the anode leads therefrom. The differentiated currents are shown adjacent the leads to the grids of the tubes V5 and V6. The plates of the tubes V5 and V6 are directly connected to the grids of the locking circuit tubes V7 and V8 respectively. The control grids of the tubes V5 and V6 are connected by biasing resistances R2 and R3 and potential sources 75 and 77 to the grounded cathodes of the respective tubes to operate the grids relatively highly negative as compared to ground so that the tubes are non-conductive. The anodes of tubes V5 and V6 are connected directly to the grids of tubes V7 and V8. Tubes V5 and V6 draw current from the plate source for the tubes V7 and V8 whose grids are positive with respect to ground but are slightly negative with respect to the cathodes of the respective tubes V7 and V8 which are raised above ground potential by resistor 74.

The tubes V7 and V8 as stated above are alternatively conductive and non-conductive. A negative pulse on the grid of the conducting tube will cause the circuit to switch over. Then the conducting tube becomes non-conducting and the non-conducting tube becomes conducting. These negative pulses are supplied by tubes V5 and V6. The tubes V5 and V6 are biased beyond cut off by resistors R2 and R3 so that only positive pulses on their grids are effective in causing plate current to flow in these tubes. When plate current flows in tubes V5 and V6 then the anode potentials swing down, i. e. become less positive. The potentials on the grids of tubes V7 and V8 swing in the same direction i. e. negative and the tube V7 or V8 which is conductive then becomes non-conductive. In operation the potentials on the grids of tubes V5 and V6 are phase displaced and first one and then the other thereof is conductive to trip the locking circuit back and forth between its two stable positions. If the square wave is applied to the differentiating circuits C2, R2, C3 and R3 90° out of phase, the positive pulses are applied to the grid of V5 half way in point of time, between successive positive and negative pulses applied to the grid of tube V6, with the result that square waves of current flow in tubes V7 and V8. When the phase relationship of the two signals changes from 90°, as it does during modulation, the "on" period of one of the locking tubes V7 or V8 decreases and the "on" period of the other tube increases. This results in a change in the average voltage at the plates of tubes V7—V8 and this change is proportional to the phase shift from 90° between the two voltages exciting tubes V1 and V3. The rectangular waves appearing at the anodes of tube V7 or tube V8 are applied to the grid of an isolating amplifier 72 shown here as an amplifier of the cathode follower type. Other types of amplifiers may be used. If desired a two-tube amplifier of any approved type may be used at 72 and then the amplifier tubes may be coupled in push-pull relation to the tubes V7 and V8. The output of this amplifier applies energy to the low pass filter 80 which removes the carrier frequency component, leaving the average component which is the modulating frequency. The audio signal at the output of the low pass filter is fed into the input circuit of the audio amplifier 14 as described above. The phase of the audio output from filter 80 may be reversed simply by connecting the grid of the isolating amplifier 72 to the plate of the opposite locking tube V8 as shown by the dotted line in Fig. 2. The purpose of the isolating amplifier 72 is to avoid loading of one side of the locking circuit which would occur if the low pass filter were connected directly to the plate of tubes V7, V8.

My phase modulated wave demodulator being a true phase demodulator, gives an output very closely proportional to the carrier phase shift. It would be impractical to use a frequency modulated wave demodulator here or a discriminator in this feedback circuit because then it would be necessary to supply a modulation modifying network to make the audio output inversely proportional to frequency. This correction is necessary because of the inherent characteristic of the frequency modulated wave demodulator when used to demodulate a phase modulated wave. The network necessary to accomplish this wave modification introduces serious phase shifts in the audio spectrum and makes it impractical to obtain much feedback without generating oscillations in the loop completed by the feedback circuit.

The phase demodulator operates at frequencies up to a few hundred kilocycles, therefore, the frequency $f1$ mentioned above is chosen in this range. The absolute value of $f1$ is not important for the phase demodulator can operate over a considerable frequency range. Small changes in the frequency difference between the two oscillators will, therefore, have no effect on the operation of the system. The change in frequency difference would not cause a change in the phase of the modulation but might shift the operating point of the phase detector slightly away from the desired 90° relationship between the signal applied to tubes V1 and V3. This might be caused by phase shift in the filters which select frequencies $f1$ in the outputs of the second and third mixers. However, if the filters are similar, the phase shift would be very nearly the same in each output. Moreover, the magnitude of the phase shift can be kept quite small by using filters with wide band pass characteristics. Some variation from the 90° relationship between the inputs to V1 and V3 is allowable provided the phase swing is less than 180°.

Where the frequencies $nf$ and $(n-1)f$ are small, the second oscillator and the second and third mixers may be omitted and the output of the mixer 30 and oscillatory energy from the oscillator 10 fed directly to the phase demodulator 42. Then the arrangement is as illustrated in Fig. 3, the operation of which is otherwise described hereinbefore in connection with Fig. 1.

What I claim is:

1. In a phase modulation system, a source of oscillatory energy of a first fixed frequency, a source of signals, a phase modulator coupled to both of said sources for modulating the phase of the oscillatory energy in accordance with the signals, a frequency multiplier coupled with said phase modulator for multiplying the frequency of the oscillatory energy and the phase deviation by a factor such that the phase deviation is slightly less than 180°, an output circuit coupled with said multiplier, a wave frequency converting stage, a coupling between said frequency converting stage and said multiplier and between said converting stage and said first named source, a frequency multiplier having a multiplication factor equal to the multiplication factor of said first-named multiplier minus one in the coupling between said first named source and said converting stage, a phase demodulator excited by oscillatory energy of the difference frequency derived from the output of said wave frequency converting stage and by energy from said first-named source, and a feedback circuit degeneratively coupling said phase demodulator to said source of signals.

2. In a phase modulation system, a first source of oscillatory energy of a first fixed frequency, a source of signals, a phase modulator coupled to both of said sources for modulating the phase of the oscillatory energy in accordance with the signals, a frequency multiplier coupled with said phase modulator for multiplying the frequency of the oscillatory energy and the phase deviation by a factor such that the phase deviation is slightly less than 180°, an output circuit coupled with said frequency multiplier, a wave frequency converting stage, a coupling between said frequency converting stage and said multiplier and between said frequency converting stage and said first named source, a frequency multiplier having a multiplication factor equal to the multiplication factor of said first-named multiplier minus one in the coupling between said first named source and said frequency converting stage, a second frequency converter, means for selecting the difference frequency from the output of said converting stage and feeding the same to said second converter, a second source of oscillatory energy of a frequency differing from the frequency of the first source by a desired relatively low frequency, means for impressing oscillations from said second source on said second converter, a third converter coupled to said first source and to said second source, a phase demodulator excited by oscillatory energy of the difference frequency derived from the output of said second converter and by oscillatory energy of the difference frequency from said third converter, and a feedback circuit degeneratively coupling said phase demodulator to said source of signals.

3. In a phase modulation system, a source of oscillatory energy of a first fixed frequency, a source of signals, a phase modulator coupled to both of said sources for modulating the phase of the oscillatory energy in accordance with the signals, a frequency multiplier coupled with said phase modulator for multiplying the frequency of the oscillatory energy and the phase deviation by a factor such that the phase deviation is slightly less than 180°, an output circuit coupled with said multiplier, a wave frequency converter, a coupling between said converter and said multiplier and between said converter and said first-named source, a frequency multiplier having a multiplication factor equal to the multiplication factor of said first-named multiplier minus one in the coupling between said first-named source and said converter, a phase demodulator excited by phase modulated oscillatory energy derived at least in part from the difference frequency output of said converter, and by energy derived at least in part from said first-named source, and a feed back circuit degeneratively coupling said phase demodulator to said source of signals.

JOHN H. PRATT.

REFERENCES CITED

The following references are of record in the file of this patent:

UNITED STATES PATENTS

| Number | Name | Date |
|---|---|---|
| 1,747,160 | Carpe | Feb. 18, 1930 |
| 2,396,688 | Crosby | Mar. 19, 1946 |
| 2,397,841 | Crosby | Apr. 2, 1946 |